United States Patent
Ohtani et al.

(10) Patent No.: US 7,838,156 B2
(45) Date of Patent: Nov. 23, 2010

(54) THICKENER FOR ALKALINE BATTERY AND ALKALINE BATTERY

(75) Inventors: Kazuya Ohtani, Kyoto (JP); Takeaki Yamaguchi, Fukuoka (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 741 days.

(21) Appl. No.: 11/662,236

(22) PCT Filed: Sep. 6, 2005

(86) PCT No.: PCT/JP2005/016336

§ 371 (c)(1),
(2), (4) Date: Mar. 8, 2007

(87) PCT Pub. No.: WO2006/028095

PCT Pub. Date: Mar. 16, 2006

(65) Prior Publication Data

US 2007/0259269 A1     Nov. 8, 2007

(30) Foreign Application Priority Data

Sep. 9, 2004   (JP) ............................. 2004-262214

(51) Int. Cl.
  *H01M 6/14*   (2006.01)
  *H01M 6/06*   (2006.01)
  *C08K 5/06*   (2006.01)
  *C08L 29/10*  (2006.01)
  *C08F 290/14* (2006.01)

(52) U.S. Cl. .................... 429/303; 525/79; 525/50; 429/206

(58) Field of Classification Search ............ 429/300, 429/303, 215, 217, 29, 42; 524/755; 525/79
See application file for complete search history.

(56) References Cited

U.S. PATENT DOCUMENTS

| 3,392,057 A | * | 7/1968 | Sakagani .................. 429/29 |
| 5,587,254 A | | 12/1996 | Kojima et al. |
| 6,265,105 B1 | | 7/2001 | Tokuda et al. |
| 6,667,133 B1 | | 12/2003 | Sumiya et al. |

(Continued)

FOREIGN PATENT DOCUMENTS

EP    0 414 990    2/1990

(Continued)

*Primary Examiner*—Jonathan Crepeau
*Assistant Examiner*—Kenneth Douyette
(74) *Attorney, Agent, or Firm*—Hamre, Schumann, Mueller & Larson, P.C.

(57) ABSTRACT

A thickener for use in an alkaline battery provides a gel viscosity ratio (N1h/N12h) of 0.7 to 1.3, the gel viscosity ratio (N1h/N12h) being a ratio of a viscosity (N1h) of a gel after being left to stand for one hour to a viscosity (N12h) of the gel after being left to stand for twelve hours (where the gel viscosity is a viscosity of a gel composed of 2.0 parts by weight of the thickener, 200 parts by weight of zinc powder, and 100 parts by weight of 37 wt % aqueous solution of potassium hydroxide, measured at 40° C. according to JIS K7117-1: 1999). An alkaline battery having a negative electrode gel in which the thickener of the present invention is used is provided. The alkaline battery exhibits improved long-term retention of discharge characteristics (discharge amount and discharge time), and improved impact resistance.

8 Claims, 1 Drawing Sheet

U.S. PATENT DOCUMENTS

| | | |
|---|---|---|
| 2003/0207179 A1 | 11/2003 | Uetani et al. |
| 2004/0170900 A1 | 9/2004 | Sumiya et al. |
| 2006/0222956 A1 | 10/2006 | Uetani et al. |

FOREIGN PATENT DOCUMENTS

| | | |
|---|---|---|
| JP | 2-119053 | 5/1990 |
| JP | 2-267863 | 11/1990 |
| JP | 3-89458 | 4/1991 |
| JP | 5-135770 | 6/1993 |
| JP | 6-260171 | 9/1994 |
| JP | 6-349484 | 12/1994 |
| JP | 7-65818 | 3/1995 |
| JP | 7-296804 | 11/1995 |
| JP | 10-50303 | 2/1998 |
| JP | 2000-67910 | 3/2000 |
| JP | 2006-79901 | 3/2006 |
| KR | 2003-77453 | 10/2003 |

* cited by examiner

FIG. 1

THICKENER FOR ALKALINE BATTERY AND ALKALINE BATTERY

TECHNICAL FIELD

The present invention relates to a thickener for an alkaline battery, and an alkaline battery. More specifically, the present invention relates to a thickener for an alkaline battery having a gel-form negative electrode, which is used as a thickener for use in a negative electrode of an alkaline battery principally containing an alkaline electrolytic solution and zinc powder. Further, the present invention also relates to an alkaline battery in which the foregoing thickener is used.

BACKGROUND ART

Conventionally, for a cathode of an alkaline battery, a mixture of a high-concentration alkaline electrolytic solution (a high-concentration aqueous solution of potassium hydroxide, which may contain zinc oxide or the like as required) and zinc powder and/or zinc alloy powder, etc., has been used principally. In order to prevent sedimentation of the zinc powder or the like in the alkaline electrolytic solution, and to increase the frequencies of contact for zinc, it has been proposed to use as a thickener cross-linked branched poly(meth)acrylic acids and salts of the same, carboxyvinyl polymer, carboxymethyl cellulose, and salts of the same, having various diameters (Patent Documents 1 to 3).
[Patent Document 1] JP 3371532 B
[Patent Document 2] JP 6(1994)-260171 A
[Patent Document 3] JP 2775829 B

DISCLOSURE OF THE INVENTION

Problem to be Solved by the Invention

Such a configuration is not necessarily satisfactory regarding the most important characteristic of batteries, that is, long-term retention of discharge characteristics (discharge amount and discharge time), avoidance of variations in the charged amount per battery of an electrolytic solution containing a thickener when charging the same in batteries, and the impact resistance of batteries, etc.

It is an object of the present invention to provide a thickener for an alkaline battery that can reduce variations in the charged amount of an electrolytic solution per battery when charging the same in alkaline batteries, and that can provide an alkaline battery that excels in long-term retention of the discharge characteristics (discharge amount and discharge time) and impact resistance. It also is an object of the present invention to provide an alkaline battery in which the foregoing thickener is used.

Means for Solving Problem

The thickener of the present invention for use in an alkaline battery is a thickener for use in an alkaline battery that is capable of providing a gel viscosity ratio (N1h/N12h) of 0.7 to 1.3, the gel viscosity ratio (N1h/N12h) being a ratio of a viscosity (N1h) of a gel after being left to stand for one hour to a viscosity (N12h) of the gel after being left to stand for twelve hours.

Here, the gel viscosity is a viscosity of a gel composed of 2.0 parts by weight of the thickener, 200 parts by weight of zinc powder, and 100 parts by weight of 37 wt % aqueous solution of potassium hydroxide, measured at 40° C. according to JIS K7117-1: 1999.

Effects of the Invention

In the case where the thickener of the present invention is used in an alkaline battery, the following effects are achieved.
(i) A battery can be produced that exhibits extremely excellent long-term retention of discharge and impact resistance.
(ii) Since an alkaline electrolytic solution obtained has good drainability (is not very sticky), it is suitable for the high-speed filling required for the recent high-speed battery production.
(iii) Because of smaller variations in the filled amount of the electrolytic solution per one battery upon filling the electrolytic solution, batteries of uniform quality can be produced even in mass production.
(iv) The present invention allows a negative electrode gel to be filled uniformly at a high speed even in a small-size battery, thereby making it possible to produce batteries of uniform quality.

BRIEF DESCRIPTION OF REFERENCE NUMERALS 1. positive electrode terminal plate
2. positive electrode can
3. positive electrode agent
4. outer can
5. separator
6. charge collector rod
7. gasket
8. negative electrode terminal plate
9. gel negative electrode
10. shrinkable tube

DETAILED DESCRIPTION OF THE INVENTION

The thickener of the present invention for use in an alkaline battery is a thickener for use in an alkaline battery that has a gel viscosity ratio (N1h/N12h) of 0.7 to 1.3, the gel viscosity ratio (N1h/N12h) being a ratio of a viscosity (N1h) of a gel after being left to stand for one hour to a viscosity (N12h) of the gel after being left to stand for twelve hours. In the present invention, a gel viscosity is a viscosity of a gel composed of 2.0 parts by weight of a thickener, 200 parts by weight of zinc powder, and 100 parts by weight of 37 wt % aqueous solution of potassium hydroxide, measured at 40° C. according to JIS K7117-1: 1999 (corresponding to ISO 2555: 1990).

The viscosity ratio (N1h/N12h) normally is 0.7 to 1.3, preferably 0.72 to 1.2, further preferably 0.75 to 1.1, and particularly preferably 0.80 to 1.0. In the case where the thickener having a viscosity ratio in the foregoing range is used in an alkaline battery, the viscosity of a negative electrode gel containing the thickener, zinc powder, and the alkaline electrolytic solution exhibits substantially no variation from immediately after the gel is formed until a late stage of a gel charging operation. Therefore, without variations in the charged amount per battery of the negative electrode gel when alkaline batteries are produced, it is possible to produce batteries that can retain excellent discharge characteristics over a long time.

Also, as a thickener of the present invention for use in an alkaline battery, a partially alkali-swollen-type thickener satisfying requirements (1) and (2) described below is preferable in which a cross-linked polymer (A) and a cross-linked polymer (B) are used in combination: the cross-linked polymer (A) is obtained by aqueous solution polymerization or reversed-phase suspension polymerization by using a cross-linking agent decomposable in an alkaline environment and containing a (meth)acrylic acid and/or an alkali metal salt thereof as a principal constituent monomer unit; and the cross-linked polymer (B) is obtained by aqueous solution polymerization or reversed-phase suspension polymerization by using an allyl ether-type cross-linking agent having 2 to 10 allyl groups and containing a (meth)acrylic acid and/or an alkali metal salt as a principal constituent monomer unit:

Requirement (1): an aqueous solution of potassium hydroxide having a concentration of 37 percent by weight (wt %) to which 2.0 wt % of the thickener and 200 wt % of zinc powder are added has a viscosity of 40 to 300 Pa·s at 40° C. after being left to stand for one day and a viscosity in the same range after being left to stand for sixty days.

Requirement (2): an aqueous solution of potassium hydroxide having a concentration of 37 wt % to which 3.0 wt % of a thickener is added has a spinnability of 0 to 20 mm.

Further, an alkaline battery having a negative electrode gel in which the foregoing thickener and zinc powder are contained is preferred, too.

The thickener of the present invention for use in an alkaline battery preferably has a gel viscosity ratio (N1d/N60d) of 0.7 to 1.3, the gel viscosity ratio (N1d/N60d) being a ratio of a viscosity (N1d) of a gel after being left to stand for one day to a viscosity (N60d) of the gel after being left to stand for sixty days. More preferably, the gel viscosity ratio is 0.8 to 1.2, and particularly preferably 0.9 to 1.1. In the case where the gel viscosity ratio is in the above-described range, the viscosity of the negative electrode gel has substantially no change during storage of the alkaline battery. Therefore, the alkaline battery can retain excellent discharge characteristics even after long-term storage.

The thickener of the present invention for use in an alkaline battery preferably is configured so that a gel obtained by stirring 2.0 parts by weight of the thickener, 200 parts by weight of zinc powder, and 100 parts by weight of an aqueous solution of potassium hydroxide having a concentration of 37 wt % so that they are mixed uniformly has a viscosity (gel viscosity) of 40 to 300 Pa·s at 40° C. after being left to stand for one day, more preferably 50 to 200 Pa·s, and particularly preferably 60 to 100 Pa·s. With the gel viscosity of not less than 40 Pa·s, the sedimentation of zinc powder in a battery can be prevented substantially. With the viscosity of not more than 300 Pa·s, the alkaline electrolytic solution has an excellent handling property.

Regarding spinnability of the thickener of the present invention for use in an alkaline battery, an aqueous solution of potassium hydroxide having a concentration of 37 wt % to which 3.0 wt % of the thickener is added preferably has a spinnability of 0 to 20 mm, and more preferably 0 to 15 mm. With the spinnability of not more than 20 mm, more excellent drainability is achieved during high-speed filling of the alkaline electrolytic solution containing the thickener into batteries, and adhesion of the electrolytic solution to the outside of a battery, which impairs workability, does not occur.

The thickener of the present invention for use in an alkaline battery preferably is a cross-linked polymer, and more preferably is a mixture of the cross-linked polymer (A) containing a cross-linking agent (a) unit that is a hydrolytically decomposable and the cross-linked polymer (B) containing a cross-linking agent (b) unit that is not hydrolytically decomposable, since it improves viscosity stability. A mixture ratio of the cross-linked polymers (A) and (B) {ratio of weights of the polymers contained in the thickener: (A)/(B)} preferably is 0.1/99.9 to 99.9/0.1, more preferably 10/90 to 90/10, and particularly preferably 15/85 to 85/15. In the case where the mixture ratio is in such a range, the viscosity stability of the thickener is improved, whereby syneresis of the alkaline electrolytic solution can be prevented. As a result, discharge can be maintained for a long time. Besides, uniform injection of the solution can be achieved when the solution is charged in batteries, and variations of the injected amount of the electrolytic solution per battery can be reduced. Thus, the mixture ratio in the foregoing range is preferred.

Among the cross-linked polymers thus mixed, the cross-linked polymer (A) contains the hydrolytically decomposable cross-linking agent (a), the polymer (A) first in a gel form in an alkaline liquid assumes a soluble state after a while since cross-linking agent units are hydrolytically decomposable with alkali, thus exhibiting alkali solubility (being soluble in alkali and not swollen by absorbing alkali). For example, in the case where the cross-linked polymer (A) is stirred at room temperature in a 37 wt % aqueous solution of KOH (potassium hydroxide) for several hours, the cross-linking agent (a) unit portions are decomposed, whereby the polymer (A) become soluble in an alkaline liquid.

Since the cross-linking agent (b) unit contained in the cross-linked polymer (B) is not hydrolytically decomposable, the cross-linked polymer (B) ever maintains a swollen gel state without being dissolved even in an alkaline liquid. Therefore, the thickener obtained by mixing the cross-linked polymer (A) and the cross-linked polymer (B) becomes a partially alkali-swollen-type thickener.

The monomers constituting the cross-linked polymers (A) and (B) are not limited particularly. To facilitate the production, etc., the monomers preferably are monoethylenically unsaturated monomers, more preferably water-soluble monoethylenically unsaturated monomers, and particularly preferably (meth)acrylic acid (salts). The most preferable monomers are those principally containing (meth)acrylic acids (salts), and they may be copolymerized as required with other monomers copolymerizable with the same. The foregoing other monomers are not limited particularly as long as they are copolymerizable, but ethylenically unsaturated monomers are preferred, and water-soluble ethylenically unsaturated monomers are more preferred.

In the present invention, "a (meth)acrylic acid" refers to "an acrylic acid and/or a methacrylic acid", and "a . . . acid (salt)" refers to "a . . . acid" and/or "a . . . acid salt". Examples of the salt include salts of alkali metals such as potassium, sodium, and lithium, and salts of alkaline-earth metals such as calcium.

Examples of the water-soluble ethylenically unsaturated monomer include:

carboxylic acid (salt) monomers such as maleic acid (salt), fumaric acid (salt), and itaconic acid (salt);

sulfonic acid (salt) monomers such as 2-acrylamide-2-methylpropane sulfonic acid (salt), sulfoalkyl(meth)acrylate, and 4-vinylbenzene sulfonic acid (salt);

amide monomers such as (meth)acrylamide, N-alkyl (having 1 to 3 carbon atoms)-substituted (meth)acrylamide [N-methyl acrylamide, N,N-dimethyl acrylamide, etc.] and N-vinyl acetamide;

alcohol monomers such as monohydroxyalkyl (having 1 to 3 carbon atoms) mono(meth)acrylate;

ether monomers such as polyethylene glycol (polymerization degree: 2 to 100) mono(meth)acrylate, polypropylene glycol (polymerization degree: 2 to 100) mono(meth)acrylate, and methoxypolyethylene glycol (polymerization degree: 2 to 100) mono(meth)acrylate; and ester monomers such as alkyl (having 1 to 5 carbon atoms) (meth)acrylate and vinyl acetate. Two or more of these ethylenically unsaturated monomers may be used in combination.

The content (wt %) of the ethylenically unsaturated monomer unit other than the foregoing (meth)acrylic acid (salt) based on the weight of the cross-linked polymer (A) or the cross-linked polymer (B) preferably is 0 to 50 wt %, more preferably 0 to 40 wt %, and particularly preferably 0 to 30 wt %. In the case where the content is in this range, the viscosity has excellent temporal stability. Therefore, an alkaline battery obtained has more excellent impact resistance and discharge characteristics.

A polymer preferred as the cross-linked polymers (A) is obtained by polymerization of a (meth)acrylic acid (salt) as a principal constituent monomer by using 0.05 to 3% of a hydrolytically decomposable cross-linking agent (a) based on the weight of the (meth)acrylic acid and the alkali metal salt of the same, a polymer preferred as the cross-linked polymer (B) is obtained by polymerization of a (meth)acrylic acid (salt) as a principal constituent monomer by using 0.05 to 3% of a cross-linking agent (b) that is not hydrolytically decomposable based on the weight of the (meth)acrylic acid and the alkali metal salt of the same.

Since the thickener of the present invention for use in an alkaline battery is used in a high-concentration alkaline aqueous solution, the monomer units contained in the cross-linked polymers (A) and (B) may be a non-neutralized material or a neutralized material. However, in order to decrease the viscosity of the cross-linked polymers (A) and (B), improve the dispersibility of the same, and improve the workability in the production of the cross-linked polymers (A) and (B), a part or an entirety of the (meth)acrylic acid units preferably are neutralized.

Here, a monomer unit of a non-neutralized material is of an acid type, while a monomer unit of a neutralized material is of a base type. For example, in the case where the monomer unit is a (meth)acrylic acid (salt), it is implied that the non-neutralized material is a (meth)acrylic acid unit, and the neutralized material is a (meth)acrylic acid salt unit.

To neutralize a monomer {e.g. (meth)acrylic acid} unit, an alkali metal hydroxide such as potassium hydroxide, sodium hydroxide, or lithium hydroxide, an alkali earth metal hydroxide such as calcium hydroxide, or an aqueous solution of the same may be added to the monomer at a stage before polymerization or to a hydrogel after polymerization. However, since a cross-linking agent (b) that is not hydrolytically decomposable, which will be described later, has a poor water-solubility, if polymerization is carried out with a high neutralization degree of the monomer unit, the cross-linking agent (b) in a predetermined amount, even if being added to a monomer aqueous solution, separates therefrom and causes the predetermined cross-linking to fail, whereby a cross-linked polymer (B) having desired physical properties cannot be obtained in some cases. In view of this, it is more preferable that polymerization is carried out with the neutralization degree of the monomer unit being set to 0 to 30 mol % and with the cross-linking agent (b) being contained therein, and thereafter the neutralization degree is adjusted further as required by adding an alkali metal hydroxide to the hydrogel.

The final neutralization degree of the monomer units of the cross-linked polymers (A) and (B) in the thickener of the present invention {content (mole percent (mol %)) of (meth) acrylic acid salt units based on a total mole number of (meth) acrylic acid units and (meth)acrylic acid salt units in the case where the monomer is a (meth)acrylic acid (salt)} preferably is 30 to 100 mol %, more preferably 40 to 90 mol %, and particularly preferably 50 to 90 mol %. In the case where the final neutralization degree is in the foregoing range, the impact resistance and discharge characteristics of the alkaline electrolytic solution are improved further.

As described above, the cross-linked polymers (A) and (B) are cross-linked with use of cross-linking agents. As the cross-linking agent to be used for the cross-linked polymer (A), the cross-linking agent (a) that is hydrolytically decomposable is used. As the cross-linking agent to be used for the cross-linked polymer (B), the cross-linking agent (b) that is not hydrolytically decomposable is used.

The hydrolytically decomposable cross-linking agent (a) unit may have a hydrolytically decomposable bond, and the hydrolytically decomposable bond may be a bond originally present in a molecule of the cross-linking agent (a), or alternatively, a bond that is to be generated by a cross-linking reaction between the cross-linking agent (a) and the monomer constituting the cross-linked polymer (A) and is to be hydrolytically decomposable.

Examples of the hydrolytically decomposable bond include ester bonds and amide bonds.

Therefore, as the hydrolytically decomposable cross-linking agent (a), preferably a compound having an ester bond and/or an amide bond, or a compound that is capable of forming an ester bond and/or an amide bond is used.

An exemplary compound that is capable of forming an ester bond and/or an amide bond is a compound having a hydroxyl group, an epoxy group, or an amino group.

Among the examples of the hydrolytically decomposable cross-linking agent (a) having a hydrolytically decomposable bond in its molecule, examples of the compound having an amide bond include N,N'-methylene bisacrylamide. Examples of the compound having an ester bond include ethylene glycol di(meth)acrylate, trimethylol propane di(meth)acrylate, trimethylol propane tri(meth)acrylate, pentaerythritol di(meth)acrylate, pentaerythritol tri(meth)acrylate, pentaerythritol tetra(meth)acrylate, and polyglycerol (polymerization degree: 3 to 13) polyacrylate. Thus, examples of the same include a copolymerizable cross-linking agent (a1) having 2 to 10 ethylenically unsaturated bonds in its molecule.

Preferred among the examples of the copolymerizable cross-linking agent (a1) are N,N'-methylene bisacrylamide, ethylene glycol di(meth)acrylate, trimethylol propane tri (meth)acrylate, and pentaerythritol tri(meth)acrylate. Among these, N,N'-methylene bisacrylamide, ethylene glycol di(meth)acrylate, and trimethylol propane tri(meth)acrylate are more preferred. Among these, N,N'-methylene bisacrylamide and trimethylol propane tri(meth)acrylate are most preferred.

An exemplary cross-linking agent coming to have a hydrolytically decomposable bond as a result of a cross-linking reaction is a reactive cross-linking agent (a2) that is reactive with a carboxylic acid. Examples of the same include polyvalent glycidyl compounds [ethylene glycol diglycidyl ether, polyglycerol (polymerization degree: 3 to 13) polyglycidyl ether (having 2 to 10 glycidyl ether groups) etc.], polyvalent amine compounds (ethylene diamine, etc.), and polyhydric alcohol compounds (glycerol, etc.). The reactive cross-linking agent (a2) is capable of reacting with a (meth)acrylic acid (salt), thereby forming an ester bond or an amide bond.

Among these, the copolymerizable cross-linking agents (a1), and polyvalent glycidyl compounds included in the reactive cross-linking agents (a2) are preferred. Among these, compounds having ester bonds among the copolymerizable cross-linking agents (a1) and polyvalent glycidyl compounds included in the reactive cross-linking agents (a2) are more preferred.

In the case where the reactive cross-linking agent (a2) is used, it is usual that at a certain stage after the cross-linking agent is added, the cross-linking reaction is enhanced by preferably being heated to 100 to 230° C., more preferably 120° C. to 160° C. Further, two or more of the reactive cross-linking agents (a2) may be used in combination, and further in combination with a copolymerizable cross-linking agent (b1), in a predetermined amount range.

The cross-linking agent (b) that is not hydrolytically decomposable does not have a hydrolytically decomposable bond in its molecule, and does not generate a hydrolytically decomposable bond as a result of a cross-linking reaction. Examples of the cross-linking agent (b) include a cross-linking agent (b1) having two or more vinyl ether bonds and a cross-linking agent (b2) having two or more allyl ether bonds. A cross-linking agent (b2) having two or more allyl ether bonds is preferred from the viewpoint of reactivity and the like.

Examples of the cross-linking agent (b1) having two or more vinyl ether bonds include ethylene glycol divinyl ether, 1,4-butane diol divinyl ether, 1,4-cyclohexane dimethanol divinyl ether, 1,6 hexane diol divinyl ether, polyethylene glycol divinyl ether (polymerization degree: 2 to 5), bisphenol A divinyl ether, pentaerythritol trivinyl ether, sorbitol trivinyl ether, and polyglycerol (polymerization degree: 3 to 13) polyvinyl ether.

Examples of the cross-linking agent (b2) having 2 or more allyl ether bonds include a cross-linking agent (b21) having 2 allyl groups and no hydroxyl group in its molecule, a cross-linking agent (b22) having 2 allyl groups and 1 to 5 hydroxyl groups in its molecule, a cross-linking agent (b23) having 3 to 10 allyl groups and no hydroxyl group in its molecule, and a cross-linking agent (b24) having 3 to 10 allyl groups and 1 to 3 hydroxyl groups in its molecule. A cross-linking agent having a hydroxyl group in its molecule is more preferred since it has good compatibility with a (meth)acrylic acid (salt), which results in improved cross-linking uniformity, which then improves the stability of the thickener, thereby making it possible to achieve more excellent long-term stability of viscosity of an alkaline electrolytic solution containing the thickener.

Examples of the cross-linking agent (b21) having 2 allyl groups and no hydroxyl group in its molecule include diallyl ether, 1,4-cyclohexane dimethanol diallyl ether, alkylene (having 2 to 5 carbon atoms) glycol diallyl ether, and polyethylene glycol diallyl ether (weight-average molecular weight: 100 to 4000).

Examples of the cross-linking agent (b22) having 2 allyl groups and 1 to 5 hydroxyl groups in its molecule include glycerol diallyl ether, trimethylol propane diallyl ether, pentaerythritol diallyl ether, and polyglycerol (polymerization degree: 2 to 5) diallyl ether.

Examples of the cross-linking agent (b23) having 3 to 10 allyl groups and no hydroxyl group in its molecule include trimethylol propane triallyl ether, glycerol triallyl ether, pentaerythritol tetraallyl ether, and tetraallyl oxyethane.

Examples of the cross-linking agent (b24) having 3 to 10 allyl groups and 1 to 3 hydroxyl groups in its molecule include pentaerythritol triallyl ether, diglycerol triallyl ether, and polyglycerol (polymerization degree: 3 to 13) polyallyl ether.

Two or more of the cross-linking agents (b) that are not by hydrolytically decomposable may be used in combination. Among the cross-linking agents (b) that are not hydrolytically decomposable, the cross-linking agents (b2) having 2 or more allyl ether bonds are preferred. Among these, the cross-linking agents having 2 to 10 allyl groups {cross-linking agents (b21) to (b24)} are more preferred. Among these, the cross-linking agents having 1 to 5 hydroxyl groups and 2 to 10 allyl groups {cross-linking agents (b22) and (b24)} are further more preferred. Among these, cross-linking agents (b24) having 3 to 10 allyl groups and 1 to 3 hydroxyl groups are particularly preferred. Among the cross-linking agents (b24), cross-linking agents (b25) having 3 to 5 allyl groups and 1 to 3 hydroxyl groups (pentaerythritol triallyl ether, sorbitol triallyl ether, etc.) are most preferred. Using these cross-linking agents is preferable since it allows efficient cross-linking to be performed. This is because these cross-linking agents have good compatibility with a (meth)acrylic acid (salt), and have a number of allyl groups, thereby compensating for the low copolymerizability inherent to the allyl groups.

The content (wt %) of the cross-linking agent (a) unit in the cross-linked polymer (A) preferably is 0.05 to 3 wt %, more preferably 0.1 to 1 wt % based on the weight of the cross-linked polymer (A), though this depends on the type of the cross-linking agent (a). The content in the foregoing range is preferred since with the foregoing content, the viscosity stability of the alkaline electrolytic solution containing the thickener for use in an alkaline battery on an initial stage of production (immediately after the production to about 12 hours after the production) can be achieved, and the syneresis of the alkaline electrolytic solution can be prevented, whereby discharge characteristics over the long term of an alkaline battery obtained are improved further.

The content (wt %) of the cross-linking agent (b) unit in the cross-linked polymer (B) preferably is 0.05 to 3 wt %, more preferably 0.1 to 1 wt % based on the weight of the cross-linked polymer (B), though this depends on the type of the cross-linking agent (b). The content in the foregoing range is preferred since with the foregoing content, the long-term viscosity stability and the repletion of the alkaline electrolytic solution containing the thickener for use in an alkaline battery, discharge characteristics over the long term of an alkaline battery obtained are improved further.

The following describes a method for producing the thickener of the present invention.

A known polymerization method can be used as a method for polymerization for obtaining the cross-linked polymers (A) and (B), and hence, the method may be any one of solution polymerization, suspension polymerization, bulk polymerization, reversed-phase suspension polymerization, or emulsion polymerization.

Among the foregoing polymerization methods, solution polymerization, suspension polymerization, reversed-phase suspension polymerization, and emulsion polymerization are preferred, among which solution polymerization, reversed-phase suspension polymerization, and emulsion polymerization are preferred further, among which solution polymerization and reversed-phase suspension polymerization are preferred particularly. For the polymerization, known polymerization initiator, chain transfer agent, and/or solvent, etc. can be used.

Among the polymerization methods, the most preferable methods are: an aqueous solution polymerization method in which the cross-linking agent (a) in the case of production of the cross-linked polymer (A) or the cross-linking agent (b) in the case of production of the cross-linked polymer (B) is added and dissolved in a monomer aqueous solution principally containing a (meth)acrylic acid (salt); and a so-called reversed-phase suspension polymerization method whereby polymerization is carried out in a manner such that a monomer aqueous solution principally containing a (meth)acrylic acid (salt), in which the cross-linking agent (a) or (b) is added and dissolved, is dispersed and suspended in a hydrophobic organic solvent (e.g. hexane, toluene, xylene) in the presence of a dispersing agent. By using such a polymerization method, it is possible to obtain a thickener that, when applied in an alkaline battery, makes the alkaline battery excellent in discharge characteristics and impact resistance.

The method in which polymerization is carried out by the aqueous solution polymerization method or the reversed-phase suspension polymerization method may be a usual method of, for example, using a radical polymerization initiator, or irradiating radioactive rays, ultraviolet rays, or electron lays.

In the case where a radical polymerization initiator is used, examples of such an initiator include:

azo compounds [azobisisovaleronitrile, azobisisobutyronitrile, 4,4'-azobis(4-cyanovaleric acid), 2,2'-azobis[2-methyl-N-(2-hydroxyethyl) propionamide, 2,2'-azobis(2-amidinopropane)hydrochloride, etc.];

inorganic peroxides [hydrogen peroxide, potassium persulfate, ammonium persulfate, sodium persulfate, etc.];

organic peroxides [di-t-butyl peroxide, cumene hydroperoxide, etc.]; and redox initiators [combinations of a reducing agent and a peroxide, examples of the reducing agent including sulfites and bisulfites of alkali metal salts, ammonium sulfites, ammonium bisulfites, and L-ascorbic acid, and examples of the peroxide including persulfates of alkali metal salts, ammonium persulfate, and hydrogen peroxide water].

Two or more of these may be used in combination.

Though varying with the type of initiator used or the like, the temperature of polymerization preferably is −10° C. to 100° C., more preferably −10° C. to 80° C. so that the polymerization degree of the monomer {the (meth)acrylic acid (salt), etc.} is increased.

The amount of the initiator is not limited particularly, but in order to increase the polymerization degree of a polymer, it preferably is 0.000001 to 3.0 wt %, and more preferably 0.000001 to 0.5 wt % based on the entire weight of the monomer {the (meth)acrylic acid (salt), etc.}.

In the case of aqueous solution polymerization, the polymerization concentration (wt %) of a monomer preferably is 10 to 40 wt %, and more preferably 10 to 30 wt %, though it may vary depending on other polymerization conditions. This is because, if the polymerization concentration is set higher, pseudo-cross-linking (self-cross-linking) of a monomer itself tends to occur with a (meth)acrylic acid (salt) in parallel with the polymerization reaction, thereby resulting in a decrease in the absorption amount of an aqueous solution and a decrease in the average polymerization degree of a polymer obtained, and further, the temperature control upon polymerization becomes difficult, thereby resulting in a decrease in the average polymerization degree of a polymer obtained and an increase in oligomer components. The polymerization temperature preferably is −10° C. to 100° C., and more preferably −10° C. to 80° C. The dissolved oxygen amount upon polymerization preferably is 0 to 2 ppm ($2 \times 10^{-4}$ wt % or less), and more preferably 0 to 0.5 ppm ($0.5 \times 10^{-4}$ wt % or less), though this depends on the added amount of a free-radical initiator, etc. In the case where the dissolved oxygen amount is in the foregoing range, cross-linked polymers (A) and (B) with high polymerization degrees can be produced.

The neutralization degree of a (meth)acrylic acid (salt) upon polymerization is not limited particularly as long as a required amount of the cross-linking agent (a) or (b) with respect to the cross-linked polymer (A) or (B) is dissolved completely in a monomer aqueous solution. However, the cross-linking agent (b) used in the production of the cross-linked polymer (B) has a smaller water-solubility, and particularly, the solubility of the cross-linking agent (b) in a (meth)acrylic acid (salt) aqueous solution is extremely small. Therefore, in some cases the cross-linking agent (b) in a predetermined amount, even if being added to a monomer aqueous solution, separates therefrom, thereby causing the predetermined cross-linking to fail. In view of this, it is preferable that polymerization is carried out with the neutralization degree of a (meth)acrylic acid (salt) upon polymerization being set to 0 to 30 mol %, and after polymerization, neutralization is carried out further as required. More preferably, polymerization is carried out in a non-neutralized state, and after polymerization, neutralization is carried out as required.

Further, in the case where a (meth)acrylic acid (salt) is polymerized under the same conditions other than the neutralization degree, the lower the neutralization degree, the higher the polymerization degree that is achieved. Therefore, to achieve a higher polymerization degree of a polymer obtained, the polymerization preferably is carried out in a state of a lower neutralization degree.

The reversed-phase suspension polymerization method is a polymerization method in which in a hydrophobic organic solvent such as hexane, toluene, or xylylene, an aqueous solution of a (meth)acrylic acid (salt) is suspended and dispersed in the presence of a dispersing agent so that polymerization is carried out. In this polymerization method also, as in the above-described case, the monomer concentration of the monomer aqueous solution preferably is 10 to 40 wt %, and more preferably 10 to 30 wt %. In the case where the monomer concentration is in the foregoing range, a cross-linked polymer (A) or (B) of a high polymerization degree can be produced.

It should be noted that in the foregoing reversed-phase suspension polymerization method, a dispersing agent may be used during polymerization. Examples of the dispersing agent include:

surfactants having a Hydrophile-Lipophile Balance (HLB) degree of 3 to 8 including sorbitan aliphatic acid esters such as sorbitan monostearic acid ester, glycerol aliphatic acid esters such as glycerol monostearic acid ester, and sucrose aliphatic acid esters such as sucrose distearic acid ester; and polymer dispersing agents (content of hydrophilic groups: 0.1 to 20 wt %, weight-average molecular weight: 1,000 to 1,000,000) having hydrophilic groups in its molecule and being soluble in a solvent in which a monomer aqueous solution is dispersed, such as maleated ethylene/acrylic acid copolymers, maleated ethylene/vinyl acetate copolymers, and styrene sulfonic acid (salt)/styrene copolymers.

However, a polymer dispersing agent preferably is used as a dispersing agent, since it facilitates the adjustment of the size of suspended particles of a monomer aqueous solution in a solvent, whereby a hydrogel of a cross-linked polymer (A) or (B) having a desired particle diameter can be prepared.

The added amount of the surfactant and/or the polymer dispersing agent preferably is 0.1 to 20 wt %, and more preferably 0.5 to 10 wt %, based on the weight of the hydrophobic organic solvent.

The weight ratio (W/O ratio) of the monomer aqueous solution to the hydrophobic organic solvent in reversed-phase suspension polymerization preferably is 0.1 to 2.0, and more preferably 0.3 to 1.0. In the case where the foregoing ratio is in this range, the adjustment of the particle size of the cross-linked polymer (A) or (B) is facilitated further.

It is more preferable that in the production of the cross-linked polymer (A) or (B), the polymerization is carried out under the same conditions, except for the absence of a cross-linking agent, as those that allow an obtained polymer to have a number-average polymerization degree of preferably 5,000 to 1,000,000, more preferably 10,000 to 1,000,000. In the case where polymerization is performed under the conditions that allow the number-average polymerization degree to be 5,000 or more, the use of a cross-linking agent in an adequate amount prevents decrease of viscosity and/or increase of spinnability from occurring in a high-concentration alkaline aqueous solution to which a thickener is added. The measurement of the number-average polymerization degree was carried out by gel permeation chromatography (GPC).

In the present method, a cross-linked polymer (A) or (B), which is obtained by aqueous solution polymerization or reversed-phase suspension polymerization, is obtained in a state of a gel containing water (hydrogel). The hydrogel, usually after being dried, is used as a thickener for use in an alkaline battery.

Regarding the method for drying a hydrogel, the following method can be referred to as an example of the same. In the case of aqueous solution polymerization, a hydrogel is fragmented to some extent (into a granulated material having a longer diameter of about 0.5 to 20 mm) by a meat chopper or a cutter-type primary crusher, or alternatively cut into a noodle form. After the hydrogel is neutralized as required by adding an alkali metal hydroxide or the like thereto, permeation drying (drying is carried out by stacking the hydrogel on a punching metal or a screen and forcing hot air of 50 to 150° C. therethrough) or ventilation drying (drying is carried out by placing the hydrogel in a container to which hot air is ventilated/circulated, or by using a machine such as a rotary kiln while further fragmenting the gel) is carried out. Among these, permeation drying is preferred since it allows the hydrogel to be dried efficiently within a short time.

On the other hand, the method for drying a hydrogel in the case of the reversed-phase suspension polymerization usually is carried out by subjecting the polymerized hydrogel and an organic solvent to solid-liquid separation by decantation or another method, and thereafter to vacuum drying (vacuum degree: about 100 to 50,000 Pa) or ventilation drying.

Another method for drying a hydrogel polymerized through aqueous solution polymerization is, for example, contact drying in which the hydrogel is compressed and drawn over a drum dryer so as to be dried. Here, it should be noted that since a hydrogel has a poor heat conductivity, in order to dry a hydrogel in this manner, it is necessary to form a thin film of a hydrogel on the drum or the like, whereby the degree of contact with the drum metal surface per unit amount of the hydrogel is extremely high. Since a commercially available drum dryer usually is made of a metal having a lower ionization tendency than that of zinc, such as iron, chromium, nickel, etc. and the hydrogel is a hydrogel of a poly(meth)acrylic acid (salt), metals having lower ionization tendencies than that of zinc elute in the hydrogel, whereby contents of such metal elements in the hydrogel increase. Still further, the extremely high degree of contact of the hydrogel with the drum and the high tackiness of the hydrogel make it necessary to peel off a dried product from the drum dryer by a tool like a knife used in contact with the drum dryer. This causes mechanical friction between the drum and the knife, thereby abrading metal surfaces of the drum or the knife. As a result, such metals mix in the dried thickener. As described above, when contact drying with use of a drum dryer or the like is used, metal ions or metal powders tend to mix in a thickener. As a result, an obtained thickener contains a considerably large amount of ions and powders of metals having lower ionization tendencies than that of zinc (metals having lower standard electrode potentials than that of zinc, represented with atomic symbols of Cr, Fe, Ni, Sn, Pb, Cu, Hg, Ag, etc.). If such a thickener is used as a thickener for use in an alkaline battery, zinc powder in the battery, in combination with ions or powders of metals having lower ionization tendencies than that of zinc, forms a battery, thereby causing hydrogen gas to be generated because of electrolysis. This causes the pressure in the battery to rise, and sometimes further causes leakage of the alkaline electrolytic solution from the battery, or even breakage of the battery in a worse case. Consequently, it is preferable that contact drying using a drum dryer or the like is not used.

In the present invention, the drying temperature upon drying a hydrogel varies depending on the type of a dryer used and the time of drying, but it preferably is 50 to 150° C., and more preferably 80 to 130° C. In the case where the drying temperature is 150° C. or lower, a polymer hardly is cross-linked by the heat due to drying (and hence an excessive rise of the cross-linkage degree due to thermal cross-linkage does not occur), the absorption amount of the aqueous solution does not decrease, and the viscosity of the alkaline electrolytic solution containing the thickener of the present invention does not decrease. In the case where the drying temperature is 50° C. or higher, the drying does not take a long time, which is efficient. The drying time also varies depending on the type of a dryer used, the temperature of drying, etc., but it preferably is 5 to 300 minutes, and more preferably 5 to 120 minutes.

A dried material of the cross-linked polymer (A) or (B) thus obtained is crushed into a powder form as required. The crushing method may be a usual method, and may be carried out by, for example, using an impact crusher (pin-type mill, cutter mill, squirrel mill, ACM pulverizer, etc.) or an air crusher (jet mill, etc.).

It should be noted that upon crushing the dried material, it is not preferable to use a crusher whose metal rotational elements are brought in direct contact with other metal elements, since the use of such a crusher would possibly cause metal powder produced by mechanical friction to mix in a thickener.

The powder-form cross-linked polymer (A) or (B) is screened as required, with use of a screening machine having a desired screen (vibration screen classifier, centrifugal classifier, etc.), so that dried powder having a desired particle diameter can be collected.

It should be noted that in the present invention, preferably metal powder such as iron powder, which has been mixed in, is removed at a certain stage after drying, by using an iron removing machine utilizing magnetism. However, even if removal of iron is carried out precisely by using an iron removing machine, it is impossible for the iron removing machine to remove metals that do not have magnetism. Besides, if a metal is contained in dried polymer particles or adheres to dried particles, it cannot be removed even if the metal has magnetism. Therefore, it is desirable to give sufficient consideration to production facilities also so that such mixing of metals does not occur.

The weight-average particle diameters of the cross-linked polymers (A) and (B), which are measured according to JIS Z8815-1994 (6.1 Dry Sieving Test) (corresponding to ISO 2591-1), preferably is 0.1 to 2,000 μm, more preferably 1 to 1,000 μm, and particularly preferably 5 to 850 μm. In the case where the mass-average particle diameter is more than 0.1 μm, an improved property of preventing sedimentation of zinc is achieved. In the case where the mass-average particle diameter is not more than 2,000 µm, the frequency of contact of zinc particles with one another is not reduced, and the cross-linked polymer (A) or (B) is not prone to impairment of discharge characteristics. The content of particles with a diameter of 0.1 µm or less preferably is not more than 3 wt %. In the case where the cross-linked polymers (A) and (B) are used in combination, the cross-linked polymers (A) and (B) may have identical or different diameters.

In the case where a thickener of the present invention is composed of a mixture of the cross-linked polymers (A) and (B), examples of the method for mixing the cross-linked polymers (A) and (B) include a dry blending method in which the cross-linked polymers (A) and (B) in respective predetermined amounts are placed in a plastic bag and are shaken sufficiently, and a mixing method using a known mixing machine (Nauta-mixer, ribbon mixer, conical blender, mortar mixer, universal mixer, Henschel mixer, biaxial kneader, etc.). However, any method can be used as long as it is a method such that the cross-linked polymer (A) and the cross-linked polymer (B) are mixed uniformly.

Regarding the contents of metals having ionization tendencies lower than that of zinc contained in the thickener of the present invention, such contents of metals can be controlled so as to fall in a range of preferably 0 to 15 ppm, more preferably in a range of 0 to 10 ppm in the thickener, by giving sufficient consideration to materials used and the above-described production facilities also.

Though depending on the structure and capacitance of a battery used and an added amount of the thickener in the battery, the content in the thickener of metals having ionization tendencies lower than that of zinc preferably is not more than 15 ppm (not more than $15 \times 10^{-4}$ wt %), because the following problem hardly occurs: zinc powder in a battery and metal ions mixing therein form a battery, thereby causing hydrogen gas to be generated because of electrolysis, which causes the pressure in the battery to rise, and further causes leakage of the alkaline electrolytic solution and breakage of the battery.

The method for producing a thickener according to the present invention, which has been described so far, can be summarized as follows, by referring to a case in which a monomer principally containing a (meth)acrylic acid (salt) is used as a typical example.

(i) A predetermined amount (in a range of 0.05 to 3 wt %, which however has to be adjusted in a specified range, since the optimal amount of the cross-linking agent varies depending on the number-average polymerization degree, polymerization concentration, etc. of the polymer) of a cross-linking agent (a) that is hydrolytically decomposable in the case of production of the cross-linked polymer (A) or a cross-linking agent (b) that is not hydrolytically decomposable in the case of production of the cross-linked polymer (B) is added to a monomer aqueous solution principally containing a (meth) acrylic acid (salt). The cross-linking agent is dissolved completely and uniformly in the monomer aqueous solution.

(ii) The polymerization preferably is carried out by aqueous solution polymerization and/or reversed-phase suspension polymerization under mild polymerization conditions such that a polymer obtained without using the cross-linking agent (a) or (b) has an average polymerization degree of 5,000 to 1,000,000, and excessive self-cross-linking hardly occurs (polymerization concentration preferably is not more than 40 wt %), so that a hydrogel of the cross-linked polymers (A) and (B) is prepared.

(iii) In the case where the polymerization is carried out by aqueous solution polymerization, it is preferable that after the obtained hydrogel is fragmented to some extent as required, a hydroxide of an alkali metal is added to the obtained hydrogel as required so that the neutralization degree thereof is adjusted, and is dried by permeation drying or ventilation drying. In the case where the polymerization is carried out by reversed-phase suspension polymerization, the hydrogel preferably is dried by vacuum drying or ventilation drying after being subjected to solid-liquid separation.

It should be noted that drying is performed at a drying temperature (temperature of dried object) of 150° C. or below (preferably 130° C. or below) within a shortest possible time, so that the thermal cross-linking of the polymer due to heat during drying is prevented also.

(iv) It is preferable that the dried crushed product obtained is subjected to a crushing operation as required, and is screened using a screening machine as required, so that a cross-linked polymer principally containing dried particles with weight-average particle diameters of preferably 0.1 to 2,000 µm, more preferably 1 to 1,000 µm, or particularly preferably 5 to 850 µm is produced.

The following describes an alkaline battery of the present invention.

The alkaline battery of the present invention is an alkaline battery in which the thickener of the present invention is blended with a negative electrode material, whereby the thickener is used as a constituent component of the gel negative electrode of the alkaline battery.

Usually, a negative electrode material of an alkaline battery is composed of 30 to 200 parts by weight of zinc powder or zinc alloy powder having an average particle diameter of about 10 to 400 µm and 0.1 to 10 parts by weight of a gelling agent per 100 parts by weight of an alkaline electrolytic solution (for example, a 35 to 40 wt % aqueous solution of potassium hydroxide in which zinc oxide is dissolved), but the alkaline battery of the present invention is configured so that a thickener of the present invention is used in place of the gelling agent of about 0.1 to 10 parts by weight. It should be noted that the thickener may be used in combination with a gelling agent.

The added amount of the thickener preferably is 0.5 to 10 wt %, and more preferably 1.0 to 5.0 wt % with respect to the weight of the alkaline electrolytic solution, though the added amount varies with the structure of a negative electrode container, the particle diameter of zinc powder, and the added amount of zinc powder to the alkaline electrolytic solution. In the case where the added amount is in the foregoing range, the alkaline electrolytic solution has an appropriate viscosity, whereby the sedimentation of zinc powder can be prevented and the handling of the same is facilitated.

An alkaline battery in which the thickener of the present invention can be used as a thickener for an alkaline electrolytic solution is not limited particularly. The thickener can be used in ordinary alkaline batteries such as LR-20 type batteries (size D alkaline batteries) and LR-6 type batteries (size AA alkaline batteries), and other various types of alkaline batteries. An alkaline battery usually has a structure such that a positive electrode agent, a charge collector rod, and a gel negative electrode are sealed in an outer can, in which the positive electrode agent and the gel negative electrode are separated from each other by a separator or the like.

Figure 1:
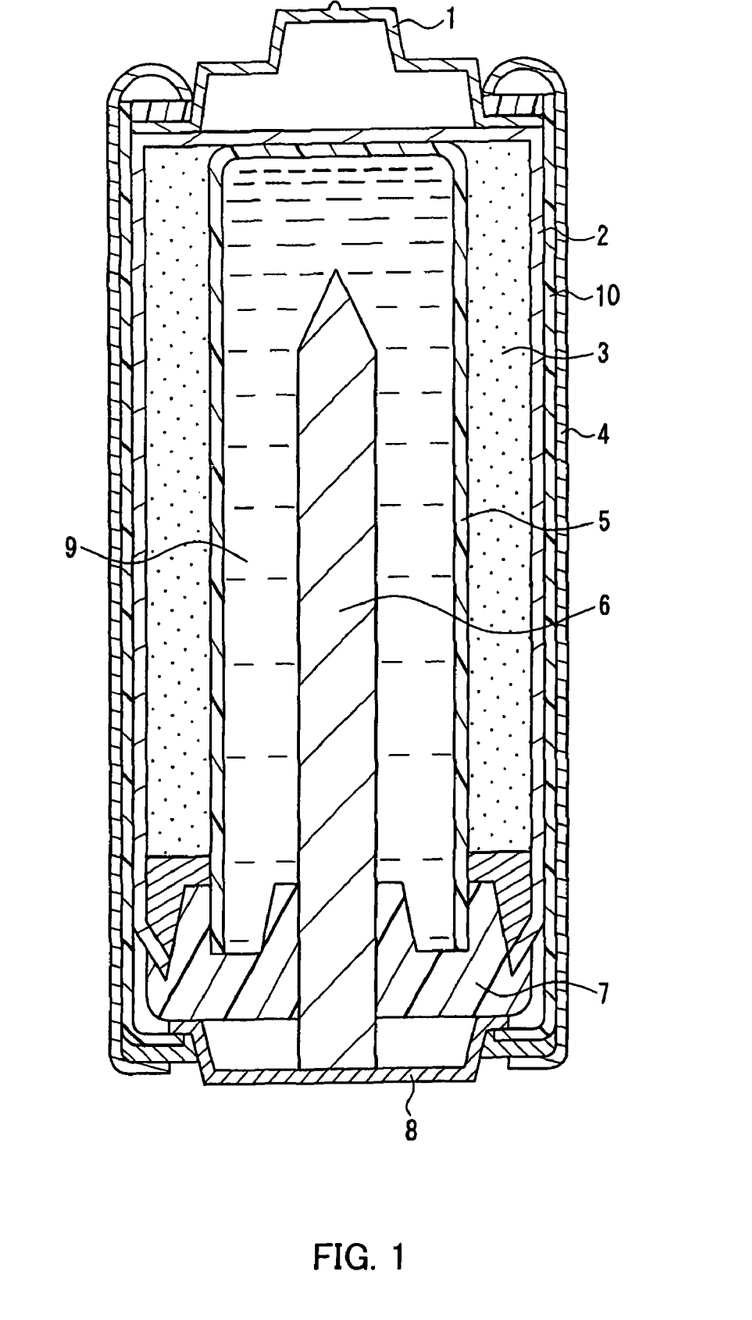
FIG. 1 is a cross-sectional view illustrating an exemplary alkaline battery of the present invention.

FIG. 1 illustrates an exemplary cross-sectional structure of an alkaline battery of the present invention. In FIG. 1, "1" denotes a positive electrode terminal plate, "2" denotes a positive electrode can, "3" denotes a positive electrode agent (composed of $MnO_2$ and carbon, etc.), "4" denotes an outer can, "5" denotes a separator, "6" denotes a charge collector rod, "7" denotes a gasket, "8" denotes a negative electrode terminal plate, "9" denotes a gel negative electrode, and 10 denotes a shrinkable tube. As described above, the alkaline battery has a structure such that the positive electrode agent 3, the charge collector rod 6, and the gel negative electrode 9 are sealed in the outer can 4, and the positive electrode agent 3 and the gel negative electrode 9 are separated from each other by the separator 5.

Though the following examples do not limit the present invention particularly, the positive electrode terminal plate 1 is formed with, for example, a nickel-plated steel sheet. The positive electrode can 2 is made of, for example, iron. The positive electrode agent 3 ($MnO_2$+carbon, etc.) is made of, for example, natural manganese dioxide or electrolytic manganese dioxide as a manganese dioxide component, or nickel oxyhydroxide as an alternative to manganese dioxide, or the like, and acetylene black as a carbon component, to which an alkaline electrolytic solution may be added further as required. The outer can 4 is formed with, for example, a nickel-plated steel sheet. Examples of the material for the separator 5 include alkali-resisting cellulose, nylon, polyolefin, acrylonitrile-vinyl chloride copolymer, polyvinyl alcohol, and combinations of these. The charge collector rod 6 is formed with, for example, a tin-plated brass rod or a tin-plated iron rod. The gasket 7 is formed with, for example, a nylon-based resin or a polyolefin-based resin. The negative electrode terminal plate 8 is formed with, for example, a nickel-plated steel sheet. Used as the gel negative electrode 9 is a negative electrode material composed of an alkaline electrolytic solution (aqueous solution of potassium hydroxide, etc.) and zinc powder (and/or zinc alloy powder), as well as another additive (hereinafter referred to as second additive) when necessary, to which the thickener of the present invention is added. The shrinkable tube 10 is formed with, for example, a tube of a heat-shrinkable resin such as polyethylene, polypropylene, polystyrene, poly(vinyl chloride), or polyester resin.

Examples of the method for filling the thickener of the present invention into an alkaline battery include: (a) preliminarily mixing the thickener of the present invention, an alkaline electrolytic solution (e.g. a high-concentration aqueous solution of potassium hydroxide, which contains zinc oxide or the like as required), and zinc powder (and/or zinc alloy powder), as well as a gelling agent and a second additive when necessary, so as to prepare a mixture for the cathode material, filling the foregoing material in a cathode container of the battery so that it functions as the gel-form negative electrode; and (b) filling the thickener of the present invention and zinc powder (and/or zinc alloy powder), as well as a gelling agent and a second additive when necessary, in a cathode container of the battery, and thereafter filling an alkaline electrolytic solution therein so that a gel-form negative electrode is generated in the cathode container. Among these, the method (a) is preferred since zinc powder can be dispersed uniformly in the cathode container of the battery.

The thickener of the present invention may contain, in addition to the cross-linked polymer(s) (A) and/or (B), a gelling agent or a second additive as required in a range such that impairment of the workability and the battery characteristics would not occur, with a view to improving the flowability of a cathode material mixture when it is filled, imparting impact resistance, etc.

Examples of the gelling agent include CMC (carboxymethyl cellulose), natural gum (guar gum, etc.), cross-linked branched-type poly(meth)acrylic acid (salt), cross-linked-type poly(meth)acrylic acid (salt) [except for the cross-linked polymer (B) of the present invention], slightly cross-linked-type poly(meth)acrylic acid (salt) in a fine powder form, and water-soluble resins such as polyvinyl alcohol. Among these, cross-linked-type poly(meth)acrylic acid (salt) [except for the cross-linked polymer (B) of the present invention] and fine-powder-form slightly cross-linked-type poly(meth)acrylic acid (salt) are preferred, since the former can impart impact resistance, and the latter as a resin itself has a relatively small spinnability, and provides flowability to the negative electrode gel when the gel is filled in a cathode container.

Regarding the particle diameter of the cross-linked-type poly(meth)acrylic acid (salt) [except for the cross-linked polymer (B) of the present invention], an average particle diameter of the same in a dried state preferably is 10 to 1000 µm, and more preferably 20 to 850 µm, since with the diameter in this range, zinc powder is allowed to be distributed around swollen particles whereby the sedimentation of zinc powder can be inhibited. Regarding the particle diameter of a fine powder such as the fine-powder-form slightly cross-linked-type poly(meth)acrylic acid (salt), an average particle diameter of the same in a dried state preferably is 0.1 to 100 µm, and more preferably 0.1 to 50 µm. With the diameter in this range, even some increase in the spinnability of the cathode material mixture due to another gelling agent added thereto does not significantly affect the variations of the filled amount of the negative electrode gel per cathode container, since the particles swollen in an alkaline environment are small. Thus, the particle diameter in this range is preferred.

The added amount of such a gelling agent that is added as required preferably is 0 to 5.0 wt %, and more preferably 0 to 3.0 wt % based on the alkaline electrolytic solution.

Examples of the second additive include known thickeners and vibration-impact-resistance improving agents Examples of the known thickener include xanthan gum, poly(meth)acrylamide, and polyethylene oxide.

As the vibration-impact-resistance improving agent, an oxide, a hydroxide, a sulfide or the like of a metal selected from the group consisting of indium, tin, and bismuth can be used.

The added amount of such a gelling agent or a second additive that is added as required preferably is 0 to 5.0 wt %, and more preferably 0 to 3.0 wt % based on the alkaline electrolytic solution.

Examples of the method for adding such a gelling agent or a second additive include: a method of carrying out dry preblend of the thickener of the present invention and a gelling agent or a second additive, followed by blending the same with other cathode materials such as zinc powder and an alkaline electrolytic solution (for example, a material contained in the gel negative electrode 9 shown in FIG. 1, such as zinc powder and/or zinc alloy powder); a method of adding and mixing a gelling agent or another thickener, separately from the thickener of the present invention, when the cathode material mixture is prepared; and a method of mixing an alkaline electrolytic solution and a gelling agent or another thickener, followed by mixing the thickener of the present invention and zinc powder. However, any method may be used as long as predetermined amounts of a gelling agent or a second additive, if necessary, can be added.

As described above, the preferred thickener of the present invention in which the cross-linked polymers (A) and (B) are used in combination has the following characteristics:

(i) Even if stirring is performed in an alkaline aqueous solution, the thickener can be dispersed uniformly in an alkaline electrolytic solution, since the thickener absorbs the electrolytic solution thereby assuming a gel state at an initial stage of stirring. Therefore, in the case where the thickener is used as a thickener for use in an alkaline battery, zinc powder adheres uniformly around particles of the gel swollen with the alkaline electrolytic solution. This improves discharge characteristics and the lifetime of the battery.

(ii) The polymerization can be carried out under control of the polymerization temperature or under mild conditions, and in the case where water having a low chain transfer constant is used as a solvent, the increase of the number-average polymerization degree of a polymer and the reduction of oligomer components can be achieved. Therefore, in the case where it is used as a thickener for a battery, both the stability of viscosity and the reduction of spinnability of a high-concentration alkaline aqueous solution are achieved at the same time. As a result, the improvement of workability of the alkaline electrolytic solution upon high-speed filling in a battery due to the reduced spinnability, and the improvement of battery characteristics due to the uniform filling of the negative electrode gel in a battery are achieved at the same time.

EXAMPLE

The following further describes the present invention while referring to Examples and Comparative Examples, which however do not limit the present invention. Hereinafter, unless provided specifically, "%" refers to percent by weight, "ultrapure water" refers to water having an electric conductivity of 0.06 μS/cm or less, and "ion-exchange water" refers to water having an electric conductivity of 1.0 μS/cm or less.

The following describes the test method used in Examples.

(1) Gel Viscosity Ratio (N1h/N12h):

<Viscosity (N1h) of Gel after being Left to Stand for One Hour>:

2 g of a thickener and 200 g of zinc powder were mixed by a Nauta-mixer, and the obtained mixture was placed in a 200-ml lidded transparent polystyrene container. Then, 100 g of 37% aqueous solution of potassium hydroxide was poured therein little by little while being stirred in a manner such that the ingredients should not become lumpy. One hour later, it was confirmed that the ingredients were gelled (or thickened) uniformly thereby becoming a gel, and then, the gel was left to stand in a constant temperature bath at 40° C. for one hour in a state with the polystyrene container sealed with the lid. The viscosity of the gel was measured according to JIS7117-1:1999 using a digital B-type viscometer (manufactured by TOKIMEC INC.), which is regarded as the viscosity (N1h) of the gel after being left to stand for one hour (measurement temperature: 40° C., rotor: No. 4, rotation speed: 3 rpm).

<Viscosity (N12h) of Gel after being Left to Stand for Twelve Hours>

A part of the sample having been subjected to the measurement of the gel viscosity after being left to stand for one hour was sealed in a polystyrene container and left to stand again in the constant temperature bath at 40° C. in a sealed state for eleven hours more. The viscosity of the ingredients was determined under the same conditions for the viscosity (N1h), and the obtained value was regarded as the viscosity (N12h) of the gel after being left to stand for twelve hours.

<Gel Viscosity Ratio (N1h/N12h)>

The gel viscosity ratio (N1h/N12h) was obtained by the following formula.

$$\text{Viscosity ratio}(N1h/N12h) = \frac{\text{Viscosity}(N1h) \text{ of gel after being left to stand for one hour}}{\text{Viscosity}(N12h) \text{ of gel after being left to stand for twelve hours}}$$

(2) Gel Viscosity Ratio (N1d/N60d):

<Viscosity (N1d) of Gel after being Left to Stand for One Day>

A part of the sample having been subjected to the measurement of the gel viscosity after being left to stand for twelve hours was sealed in a polystyrene container and left to stand again in the constant temperature bath at 40° C. in a sealed state for twelve hours more. The viscosity of the ingredients was determined under the same conditions for the viscosity (N1h), and the obtained value was regarded as the viscosity (N1d) of the gel after being left to stand for one day.

<Viscosity (N60d) of Gel after being Left to Stand for Sixty Days>

A part of the sample having been subjected to the measurement of the gel viscosity after being left to stand for one day was sealed in a polystyrene container and left to stand again in the constant temperature bath at 40° C. in a sealed state for 59 days. The viscosity of the ingredients was determined under the same conditions for the viscosity (N1h), and the obtained value was regarded as the viscosity (N60d) of the gel after being left to stand for sixty days.

<Gel Viscosity Ratio (N1d/N60d)>

The gel viscosity ratio (N1d/N60d) was obtained by the following formula.

$$\text{Viscosity ratio}(N1d/N60d) = \frac{\text{Viscosity}(N1d) \text{ of gel after being left to stand for one day}}{\text{Viscosity}(N60d) \text{ of gel after being left to stand for sixty days}}$$

(3) Spinnability of Aqueous Solution of Potassium Hydroxide (Having a Concentration of 37 wt % of Potassium Hydroxide) Containing 3.0 wt % of Thickener:

In a gel sample having been subjected to the measurement of the viscosity after being left to stand for one day, a glass bulb having a 11 mm long and 8 mm wide spheroidal shape having, on one side thereof, a cylindrical joint part having a diameter of 2.5 mm and a length of 10 mm, which is attached to a spinnability tester (manufactured by Kyowa Interface Science Co., Ltd), was placed so that the joint part was oriented to an upper side, to an extent such that the sample reached an upper end of the joint part, and the glass bulb was lifted at a speed of 16 mm/sec, so as to be pulled up out of the gel sample. When the glass bulb was separated completely from the gel sample, the lifting of the glass bulb was stopped, and a distance (mm) between the top face of the gel and the point where the glass bulb was separated from the gel was determined by using a measuring instrument attached to the spinnability tester. The same operation was carried out ten times, and an average of the measured values was regarded as the spinnability (mm).

(4) Content of Metal Elements Having Ionization Tendencies Lower than that of Zinc:

In a fluorocarbon resin "Teflon" (registered trademark) decomposition container attached to a wet ashing machine (manufactured by Milestone Inc.: "MLS-1200MEGA"), 0.5 g of the thickener, 3 ml of hydrochloric acid, and 4 ml of nitric acid were placed and sealed. The "Teflon" decomposition container was set in the wet ashing machine and the wet ashing machine was operated so that the sample was decomposed completely. Ultrapure water was added to the decomposed sample so that an amount of the obtained liquid was adjusted to be 9 g in total, and measurement by inductively coupled radio-frequency plasma spectrometry (ICP) was carried out regarding contents of metal elements of Fe, Ni, Cr, Sn, Pb, Cu, and Ag. Separately, calibration curves were created regarding the foregoing metal elements by using standard solutions, and using the calibration curves, and the respective contents of the foregoing metals were determined.

$$\text{Content of metal elements (ppm)} = \frac{\text{Total amount (g) of metal elements}}{\text{(Fe, Ni, Cr, Sn, Pb, Cu, and Ag) in thickener} \times 9}{0.5 \text{ (g)}}$$

In the forgoing formula, "0.5 (g)" refers to the weight of the thickener.

Example 1

In a 2-liter beaker, 200 g of acrylic acid, 0.6 g (0.3 wt %/acrylic acid) of trimethylol propane triacrylate, and 800 g of ion-exchange water were placed, and were stirred so as to be mixed. Thus, an aqueous solution of acrylic acid was prepared, and was cooled to 8° C.

The aqueous solution of acrylic acid was poured in a 1.5-liter adiabatic polymerization tank, and nitrogen was introduced into the aqueous solution so that a dissolved oxygen amount in the aqueous solution of acrylic acid was adjusted to be 0.1 ppm or less. In the adiabatic polymerization tank, 4.0 g of 0.1% hydrogen peroxide water, 4.0 g of 0.1% aqueous solution of L-ascorbic acid, and 1.0 g of 10% aqueous solution of 2,2'-azobis(2-amidinopropane)hydrochloride (produced by WAKO PURE CHEMICAL INDUSTRIES, LTD., trade name: "V-50") were added thereto, and the purge of dissolved oxygen by introducing nitrogen in the aqueous solution was continued until the polymerization started. After it was observed that polymerization started and the viscosity of the aqueous solution of acrylic acid started increasing, the purge of dissolved oxygen by introducing nitrogen was stopped, and the polymerization was allowed to continue for 6 hours. The temperature of the aqueous solution of acrylic acid was measured by a multi-point thermometer, and it was determined that the highest temperature achieved was 63° C.

It should be noted that the average polymerization degree of a polymer polymerized under the same conditions except that the foregoing cross-linking agent was not used was determined by gel permeation chromatography (GPC) to be about 28,000.

The block-type cross-linked hydrogel thus obtained was removed out of the adiabatic polymerization tank, and was fragmented by a small-size meat chopper (manufactured by Loyal Co., Ltd.) into noodle form so that each piece had a diameter of 3 to 10 mm. Thereafter, 222 g of 40% aqueous solution of sodium hydroxide (guaranteed reagent) was added thereto, so as to neutralize the hydrogel (neutralization degree: 80 mol %).

The hydrogel thus neutralized was stacked with a thickness of 5 cm on a screen made of a SUS material having a mesh-opening of 850 μm, and hot air at 120° C. was permeated through the hydrogel for one hour by using a small-size permeation dryer (manufactured by Inokin Co., Ltd.) so as to dry the hydrogel.

The dried material was crushed by using a household mixer, and particles of the same having particle diameters of 32 to 500 μm (400 mesh to 30 mesh) were collected by using sieves, whereby a cross-linked polymer (A1) of the present invention was obtained.

A cross-linked polymer (B1) was produced in the same manner as that for the above-described production of the cross-linked polymer (A1) except that pentaerythritol triallyl ether (produced by DAISO CO., LTD.) was used in place of trimethylol propane triacrylate, and that a polymer having a number-average polymerization degree of about 30,000 in the case where polymerization was carried out without the use of the cross-linking agent was used in place of the polymer having such a number-average polymerization degree of about 28,000.

The cross-linked polymers (A1) and (B1) obtained as described above were subjected to a mixing operation at a mixture ratio of 1:1 by weight by a laboratory Nauta-mixer (manufactured by Hosokawa Micron Corporation, "Labomixer LV-1") for 30 minutes, whereby a thickener (1) of the present invention was obtained. Regarding the thickener (1) of the present invention, the following were measured: contents of metal elements in the thickener; gel viscosities of 37% aqueous solution of potassium hydroxide to which 2.0 parts by weight of the thickener and 200 parts by weight of zinc powder were added, after being left to stand for one hour and for twelve hours, and a ratio of the viscosities; gel viscosities of the foregoing solution after being left to stand for one day and for sixty days, and a ratio of the viscosities; and spinnability.

The same determination operations were carried out with respect to Examples 2 to 7 and Comparative Examples 1 to 8. The results are shown in Tables 1 and 2.

Example 2

The same operations as those of Example 1 were carried out except that ethylene glycol diglycidyl ether (produced by Nagase ChemteX Corporation, trade name: "Denacol EX-810") was used in place of trimethylol propane triacrylate in Example 1, whereby a cross-linked polymer (A2) was obtained and used. As a result, a thickener (2) of the present invention was obtained.

Example 3

The same operations as those of Example 1 were carried out except that the mixture ratio (ratio by weight) of the cross-linked polymers (A1) and (B1) was set to 1:2. As a result, a thickener (3) of the present invention was obtained.

Example 4

In a 1-liter beaker, 100 g of acrylic acid and 272.2 g of ion-exchange water were placed and mixed so that the acid was dissolved in the water. While the beaker was cooled with an ice bath, 100 g of 40 wt % aqueous solution of sodium hydroxide was added thereto so that a part (72 mol %) of acrylic acid was neutralized. 0.3 g (0.3 wt %/acrylic acid) of ethylene glycol diglycidyl ether was added to the monomer solution thus neutralized and mixed, and a cross-linking agent was dissolved therein. The monomer aqueous solution in which the cross-linking agent was thus dissolved was cooled to 5° C., and thereafter, 0.2 g of potassium persulfate was added thereto as a polymerization initiator, whereby a monomer aqueous solution was obtained.

In a 2-liter separable flask equipped with an agitator and a condenser, 1000 ml of cyclohexane and 10 g of sodium styrene sulfonate/styrene block copolymer (copolymerized molar ratio: 30/70) as a disperser were stirred while the ingredients were heated to 60° C. with a water bath, so that the disperser was dissolved in cyclohexane.

Nitrogen was introduced into the cyclohexane solution in the separable flask so that a dissolved oxygen amount in cyclohexane was adjusted to be 0.1 ppm or less. Thereafter, while cyclohexane was stirred by the agitator, 400 g of the monomer aqueous solution thus obtained was dropped by using a dropping funnel, so that reversed-phase suspension polymerization was performed at a polymerization temperature of 60° C. Further, after the dropping of the monomer aqueous solution was completed, the heating was continued further for 2 hours, so that the suspension polymerization was completed. As a result, a hydrogel in a spherical form was obtained in cyclohexane.

After the rotation of the agitator was stopped and the hydrogel thus obtained settled down, cyclohexane was removed by decantation. The remaining hydrogel was washed with cyclohexane several times so that the disperser adhering to the hydrogel was removed.

The spherical-form hydrogel thus obtained was spread over a release paper, and was dried by a vacuum dryer (vacuum degree: 10,000 to 20,000 Pa) at 80° C. for 2 hours. Thus, a cross-linked polymer (A3) was obtained.

It should be noted that the relationship between the vacuum degree and the actual pressure in the present invention was as follows:

Actual pressure =

Normal atmospheric pressure$(1.013 \times 10^5 Pa)$ − Vacuum degree

In a 1-liter beaker, 100 g of acrylic acid, 272.2 g of ion-exchange water, and 0.2 g (0.2 wt %/acrylic acid) of pentaerythritol triallyl ether were placed and mixed, and a cross-linking agent was dissolved therein. While the beaker was cooled with an ice bath, 27.8 g of 40 wt % aqueous solution of sodium hydroxide was added thereto so that a part (20 mol %) of acrylic acid was neutralized. The monomer solution thus neutralized was cooled to 5° C., and thereafter, 0.2 g of potassium persulfate was added thereto as a polymerization initiator.

A cross-linked polymer (B2) was produced in the same manner as that for the above-described production of the cross-linked polymer (A3) except that the above-described neutralized monomer solution was used in place of the monomer aqueous solution in which the above-described cross-linking agent was dissolved.

A thickener (4) of the present invention was obtained by mixing the above-described cross-linked polymers (A3) and (B2) at a ratio (ratio by weight) of 2:1.

Example 5

A thickener (5) of the present invention was obtained in the same manner as that for Example 1 except that the following drying method was used instead of the drying method of Example 1.

(Drying Method)

A fragmented hydrogel was placed between a drum dryer made of an alloy of iron and chromium (manufactured by Kusunoki Kikai Seisakusho), which was heated to 160° C., and a pressure roll made of fluorocarbon resin "Teflon" (registered trademark) attached to the drum dryer (clearance between the drum dryer and the pressure roll: 0.5 mm), and the hydrogel was rolled with a thickness of 0.5 mm on the drum dryer and dried for 3 minutes. After drying, a knife (made of a SUS material) attached to the drum dryer was brought into contact with the drum dryer, so as to separate the dried film from the drum dryer. The thickness of the film was determined by a thickness gauge to be about 0.2 mm.

The dried film was crushed by a household mixer, and particles having diameters of 32 to 500 μm were collected by a screening machine.

Example 6

A thickener (6) of the present invention was produced using only the cross-linked polymer (A1) of Example 1.

Example 7

A thickener (7) of the present invention was produced using only the cross-linked polymer (B2) of Example 4.

Comparative Example 1

Commercially-available carboxyl methyl cellulose ("CMC2450" produced by DAICEL CHEMICAL INDUSTRIES, LTD.) was used as a comparative thickener (H1).

Comparative Example 2

Commercially-available slightly cross-linked type polyacrylic acid fine powder ("Carbopole 941" produced by B. F. Goodrich Chemical Company, mass-average particle diameter: about 20 μm) was used as a comparative thickener (H2).

Comparative Example 3

A comparative thickener (H3) was obtained in the same manner as that for Example 1 except that the added amount of trimethylol propane triacrylate was 0.06 g (0.03%/acrylic acid).

Comparative Example 4

A comparative thickener (H4) was obtained in the same manner as that for Example 1 except that the added amount of trimethylol propane triacrylate was 8.0 g (4.0%/acrylic acid).

Comparative Example 5

A comparative thickener (H5) was obtained in the same manner as that for Example 1 except that the added amount of pentaerythritol triallyl ether was 0.06 g (0.03%/acrylic acid).

Comparative Example 6

A comparative thickener (H6) was obtained in the same manner as that for Example 1 except that the added amount of pentaerythritol triallyl ether was 8.0 g (4.0%/acrylic acid).

Comparative Example 7

The same operations as those of Example 1 were carried out except that the added amount of an added polymerization initiator (hydrogen peroxide, ascorbic acid, "V-50") was increased by 10 times, and that 20% ethanol aqueous solution [ethanol/water=20/80 (weight ratio)] was used instead of ion-exchange water. As a result, a comparative thickener (H7) was obtained.

It should be noted that an average polymerization degree of a polymer obtained by polymerization without using trimethylol propane triacrylate as a cross-linking agent was determined by GPC, in which a number-average polymerization degree thereof was determined to be about 1,800. An average polymerization degree of a polymer obtained by polymerization without using pentaerythritol triallyl ether was determined by GPC, in which a number-average polymerization degree thereof was determined to be about 1,700.

Comparative Example 8

The same operations as those of Example 1 were carried out without using the two types of cross-linking agents used in Example 1, and a comparative thickener (H8) was obtained.

Using the thickeners (1) to (7) prepared in Examples 1 to 7, the comparative thickeners (H1) to (H8) prepared in Comparative Examples 1 to 8, and an alkaline electrolytic solution, the sedimentation of zinc powder (produced by UNION MINIERES. A., product name: "004F(2)/68"), the injection time and the variability of injected amount of prepared negative electrode gels, the amount of hydrogen gas generated, and the duration and impact resistance of model batteries were determined in the following manners.

The results are shown in Tables 2 and 3.

(Sedimentation of Zinc Powder)

In a 1-liter biaxial kneader (produced by IRIE SHOKAI Co., Ltd., product name: "PNV-1"), 150 g of 37% aqueous solution of potassium hydroxide, 300 g of zinc powder having a mass-average particle diameter of 120 µm, 1.5 g of the thickener, and 1.5 g of a gelling agent (trade name: "SAN-FRESH DK-500B" produced by Sanyo Chemical Industries, Ltd.) were placed, and are mixed at a rotation speed of 50 rpm for 60 minutes, whereby a negative electrode gel was prepared.

50 g of the negative electrode gel thus prepared was placed in a sealable 50-ml sample container (diameter: 34 mm, height: 77 mm, made of polypropylene), and air bubbles contained upon mixing were removed under a reduced pressure.

The sample container was sealed and left to stand in a constant temperature vessel at 40° C. for 30 days, and thereafter, the sample container was subjected to tapping 300 times at a rate of 30 times per minute from a height of 3 cm by using a device attached to a powder tester (manufactured by Hosokawa Micron Corporation) so that the sedimentation of zinc powder was accelerated. After the tapping was stopped, the distance (mm) between the initial position of zinc powder in the negative electrode gel before the tapping (the position of the upper end portion of the negative electrode gel in the sample container) and the position of an upper end portion where zinc powder was present after the tapping was measured, and this was used as a sedimentation (mm) of zinc powder.

(Injection Time and Variability of Injected Amount)

In a 1-liter biaxial kneader, 150 g of 37% aqueous solution of potassium hydroxide, 300 g of zinc powder having a mass-average particle diameter of 120 µm, 1.5 g of the thickener, and 1.5 g of a gelling agent (trade name: "SANFRESH DK-500B" produced by Sanyo Chemical Industries, Ltd.) were placed, and mixed at a rotation speed of 50 rpm for 60 minutes, whereby a negative electrode gel was prepared. The negative electrode gel thus prepared was transferred into a beaker, and air bubbles contained upon mixing were removed under a reduced pressure.

The negative electrode gel from which air bubbles had been removed was drawn into a 20-ml syringe calibrated in 0.1 ml, having an inlet with an internal diameter of 2 mm.

At a height of an opening of a 5-ml sample container (internal diameter: 18 mm, height: 40 mm), the syringe was compressed by 2.0 ml so that the negative electrode gel was injected into the sample container. The time (second) from the stop of the compression of the syringe until complete separation of the negative electrode gel from the inlet of the syringe was measured with a stop watch. The same operation was repeated 20 times in total, and an average of the measured times was regarded as an injection time (second).

Regarding each of the 20 injection operations, the weight of the negative electrode gel injected into the sample container were measured, and a standard deviation (σ) of the injected amount was calculated, which was regarded as variability of the injected amount.

(Amount of Hydrogen Gas Generated)

In a 50-ml sample container (diameter: 34 mm, height: 77 mm, made of polypropylene), 15 g of 37% aqueous solution of potassium hydroxide, 30 g of zinc powder having a mass-average particle diameter of 120 µm, 0.15 g of the thickener, and 0.15 g of a gelling agent (trade name: "SANFRESH DK-500B" produced by Sanyo Chemical Industries, Ltd.) were placed, and are mixed at a rotation speed of 50 rpm for 60 minutes.

The sample container was sealed with a lid (having a hole with a diameter of about 3 mm in which a gas detector tube could be inserted, the hole being closed with a seal tape), and was left to stand in a constant temperature vessel at 50° C. for 30 days.

The sample container was taken out 30 days later, and a hydrogen gas detector tube (Kitagawa Gas Detector Tube System, manufactured by KOMYO RIKAGAKU KOGYO K. K., hydrogen gas measuring range: 500 to 8000 ppm) was inserted into a gas-phase part in the sample container via the hole preliminarily opened in the lid, so that a hydrogen gas concentration in the gas-phase part was measured.

(Duration of Battery)

In a 1-liter biaxial kneader, 150 g of 37% aqueous solution of potassium hydroxide, 300 g of zinc powder, 1.5 g of the thickener, and 1.5 g of a gelling agent (trade name: "SAN-FRESH DK-500B" produced by Sanyo Chemical Industries, Ltd.) were placed, and are mixed at 50 rpm for 60 minutes, whereby a negative electrode gel was prepared.

After air bubbles were removed under a reduced pressure, 15 g of the negative electrode gel thus obtained was injected into a negative electrode container of a LR-6 type model battery as shown in FIG. 1 so as to function as the gel negative electrode 9. Thus, the model battery was prepared. As the materials for the members of the model battery other than the gel negative electrode 9, the following materials were used. A nickel-plated steel sheet was used as a material for the positive electrode terminal plate 1. Iron was used as a material for the positive electrode can 2. A formulation of 50 parts by weight of electrolytic manganese dioxide, 5 parts by weight of acetylene black, and 1 part by weight of an aqueous solution of potassium hydroxide having a concentration of 37 wt % was used as a material for the positive electrode agent 3. A nickel-plated steel sheet was used as a material for the outer can 4. Polyolefin was used as a material for the separator 5. A tin-plated brass-made rod was used as a material for the charge collector rod 6. A polyolefin-based resin was used as a material for the gasket 7. A nickel-plated steel sheet was used as a material for the negative electrode terminal plate 8. Polyethylene was used as a material for the shrinkable tube 10. The model battery, thus formed, was connected to an external resistor of 2Ω at room temperature (20 to 25° C.) and was discharged continuously, so that the time until the voltage was lowered to 0.9 V was determined as the duration of the battery (hour). The same operation was carried out with respect to another model battery that was left to stand in a constant temperature vessel at 60° C. for 60 days after it was formed, and the duration of the battery was measured.

(Impact Resistance of Battery)

A model battery formed in the same manner as described above was dropped from a height of 1 m 10 times continuously while being connected with an external resistor of 2Ω at room temperature (20 to 25° C.) for continuous discharge. The voltage before this dropping operation and the voltage immediately after the foregoing operation were measured, and the impact resistance (%) was calculated by the following formula:

$$\text{Impact resistance}(\%) = \frac{[\text{Voltage (V) immediately after dropping (10th time)}]}{[\text{Voltage (V) before dropping}]} \times 100$$

The same operation was carried out with respect to another model battery that was left to stand in a constant temperature vessel at 60° C. for 60 days after it was formed, and the impact resistance of the same was determined.

TABLE 1

| | Thickener | Viscosity (Pa·s) N1h | Viscosity (Pa·s) N12h | Viscosity Ratio N1h/N12h | Viscosity (Pa·s) N1d | Viscosity (Pa·s) N60d | Viscosity Ratio N1d/N60d |
|---|---|---|---|---|---|---|---|
| Example | 1 (1) | 60 | 70 | 0.86 | 70 | 80 | 0.88 |
| | 2 (2) | 60 | 70 | 0.86 | 70 | 80 | 0.88 |
| | 3 (3) | 85 | 90 | 0.94 | 95 | 105 | 0.90 |
| | 4 (4) | 45 | 60 | 0.75 | 60 | 65 | 0.92 |
| | 5 (5) | 60 | 70 | 0.86 | 70 | 80 | 0.88 |
| | 6 (6) | 50 | 60 | 0.83 | 60 | 70 | 0.86 |
| | 7 (7) | 50 | 60 | 0.83 | 60 | 30 | 2.00 |
| Comparative Example | 1 (H1) | 30 | 70 | 0.43 | 80 | 9 | 8.89 |
| | 2 (H2) | 60 | 110 | 0.55 | 120 | 130 | 0.92 |
| | 3 (H3) | 20 | 40 | 0.50 | 50 | 40 | 1.25 |
| | 4 (H4) | 10 | 30 | 0.33 | 40 | 20 | 2.00 |
| | 5 (H5) | 20 | 40 | 0.50 | 50 | 40 | 1.25 |
| | 6 (H6) | 10 | 20 | 0.50 | 30 | 20 | 1.50 |
| | 7 (H7) | 6 | 10 | 0.60 | 10 | 5 | 2.00 |
| | 8 (H8) | 20 | 40 | 0.50 | 50 | 55 | 0.91 |

TABLE 2

| | Gelling Agent | Spinnability (mm) | Content of Metal Elements (ppm) | Sedimentation of Zinc Powder (mm) | Injection Time (Sec) | Variability of Injection Amount σ | Amount of Hydrogen Gas Generated (ppm) |
|---|---|---|---|---|---|---|---|
| Example | 1 (1) | 10 | 1.9 | 3.5 | 0.3 | 0.02 | 500> |
| | 2 (2) | 12 | 1.8 | 1.5 | 0.2 | 0.02 | 500> |
| | 3 (3) | 5 | 1.8 | 2.5 | 0.3 | 0.04 | 500> |
| | 4 (4) | 7 | 0.8 | 2.5 | 0.4 | 0.04 | 500> |
| | 5 (5) | 10 | 53.8 | 2.5 | 0.5 | 0.04 | 2200 |
| | 6 (6) | 25 | 4.3 | 2.8 | 0.4 | 0.05 | 500> |
| | 7 (7) | 10 | 2.8 | 8 | 0.5 | 0.05 | 500> |
| Comparative Example | 1 (H1) | 40 | 7.6 | 50 | 4.2 | 0.24 | 500> |
| | 2 (H2) | 58 | 3.1 | 32 | 4.5 | 0.18 | 500> |
| | 3 (H3) | 40 | 1.9 | 38 | 5.3 | 0.26 | 500> |
| | 4 (H4) | 15 | 1.9 | 8 | 0.6 | 0.11 | 500> |
| | 5 (H5) | 35 | 3.8 | 10 | 0.3 | 0.06 | 500> |
| | 6 (H6) | 7 | 4.2 | 8 | 0.4 | 0.05 | 500> |
| | 7 (H7) | 3 | 1.8 | 9 | 0.5 | 0.08 | 500> |
| | 8 (H8) | 60 | 1.6 | 51 | 6.5 | 0.32 | 500> |

TABLE 3

| | Thickener | Duration (hour) Immediately After Production | Duration (hour) After Sixty-Day Storage | Impact Resistance (%) Immediately After Production | Impact Resistance (%) After Sixty-Day Storage |
|---|---|---|---|---|---|
| Example | 1 (1) | 20.4 | 19.2 | 97 | 96 |
| | 2 (2) | 19.3 | 18.2 | 97 | 96 |
| | 3 (3) | 20.3 | 19.5 | 96 | 94 |
| | 4 (4) | 19.4 | 18.9 | 97 | 95 |
| | 5 (5) | 19.1 | 18.5 | 96 | 95 |
| | 6 (6) | 19.4 | 18.8 | 85 | 82 |
| | 7 (7) | 19.1 | 18.4 | 94 | 93 |
| Comparative Example | 1 (H1) | 12.3 | 10.8 | 15 | 8 |
| | 2 (H2) | 18.6 | 17.9 | 33 | 27 |
| | 3 (H3) | 19.2 | 17.5 | 75 | 73 |
| | 4 (H4) | 18.4 | 16.9 | 85 | 78 |
| | 5 (H5) | 19.1 | 17.7 | 65 | 55 |
| | 6 (H6) | 18.7 | 12.1 | 78 | 75 |
| | 7 (H7) | 14.3 | 12.0 | 62 | 57 |
| | 8 (H8) | 16.8 | 13.6 | 30 | 14 |

INDUSTRIAL APPLICABILITY

When used as a thickener for use in a gel-form negative electrode of an alkaline battery, the thickener of the present invention makes it possible to produce a battery that exhibits extremely excellent duration of discharge and impact resistance over a long time. Further, since an alkaline electrolytic solution in which the thickener of the present invention is used exhibits excellent drainability (is not very sticky), the alkaline electrolytic solution is enough suitable for the high-speed filling required for the recent high-speed battery production. Further, because of smaller variations in the filled amount of the electrolytic solution per one battery when an electrolytic solution in which the thickener of the present invention is added is filled in alkaline batteries, batteries of uniform quality can be produced even in mass production. Still further, since a negative electrode gel can be filled uniformly at a high speed even in small-size batteries, it is possible to produce batteries of uniform quality. Therefore, the thickener of the present invention is preferable as a thickener for use in a gel-form negative electrode of an alkaline battery. Still further, the thickener of the present invention is useful, not only as a thickener for cylindrical alkaline batteries, but also as a thickener for primary and secondary alkaline batteries such as alkaline button batteries, silver oxide batteries, nickel-cadmium storage batteries, and nickel metal hydride storage batteries.

The alkaline battery of the present invention in which the thickener of the present invention is used is useful as an alkaline battery that exhibits excellent long-term retention of discharge characteristics (discharge amount and discharge time) and excellent impact resistance. Therefore, the alkaline battery of the present invention can be used suitably as a primary or secondary battery in electrical appliances and portable household electrical appliances that require excellent discharge characteristics, such as toys, portable CD players, and portable MD players.

The invention claimed is:

1. A thickener for use in an alkaline battery, comprising:
   a cross-linked polymer (A) comprising a cross-linking agent composed of a cross-linking agent (a) unit alone that is hydrolytically decomposable; and
   a cross-linked polymer (B) comprising a cross-linking agent composed of a cross-linking agent (b) unit alone that is not hydrolytically decomposable,
   wherein a principal constituent monomer of the cross-linked polymer (A) and the cross-linked polymer (B) is a (meth)acrylic acid or salt thereof,
   the cross-linking agent (a) unit that is hydrolytically decomposable is a compound having at least one type of bond selected from the group consisting of an ester bond and an amide bond, or a compound that can form at least one type of bond selected from the group consisting of an ester bond and an amide bond,
   the cross-linking agent (b) unit that is not hydrolytically decomposable is a cross-linking agent having 2 to 10 allyl groups,
   a content (wt %) of the cross-linking agent (a) unit in the cross-linked polymer (A) is 0.05 to 3 wt % based on weight of the cross-linked polymer (A),
   a content (wt %) of the cross-linking agent (b) unit in the cross-linked polymer (B) is 0.05 to 3 wt % based on weight of the cross-linked polymer (B),
   the cross-linked polymers (A) and (B) are polymerized individually, in such a manner that each of the cross-linked polymers (A) and (B) excluding the cross-linking agent has a number-average polymerization degree of 5,000 to 1,000,000, and
   the thickener providing a gel viscosity ratio (N1h/N12h) of 0.7 to 1.3, the gel viscosity ratio (N1h/N12h) being a ratio of a viscosity (N1h) of a gel after being left to stand for one hour to a viscosity (N12h) of the gel after being left to stand for twelve hours,
   where the gel viscosity is a viscosity of a gel composed of 2.0 parts by weight of the thickener, 200 parts by weight of zinc powder, and 100 parts by weight of 37 wt % potassium hydroxide aqueous solution, measured at 40° C. according to JIS K7117-1: 1999.

2. The thickener according to claim 1,
   wherein the thickener provides a gel viscosity ratio (N1d/N60d) of 0.7 to 1.3, the gel viscosity ratio (N1d/N60d) being a ratio of a viscosity (N1d) of the gel after being left to stand for one day to a viscosity (N60d) of the gel after being left to stand for sixty days.

3. The thickener according to claim 1,
   wherein the viscosity (N1d) of the gel after being left to stand for one day is 40 to 300 Pa·s.

4. The thickener according to claim 1,
   wherein a potassium hydroxide aqueous solution that contains 37 wt % of potassium hydroxide and 3.0 wt % of the thickener has a spinnability of 20 mm or less.

5. The thickener according to claim 1,
   wherein the cross-linking agent (a) that is hydrolytically decomposable is at least one selected from the group consisting of N,N'-methylene bisacrylamide, trimethylol propane di(meth)acrylate, trimethylol propane tri(meth)acrylate, pentaerythritol tri(meth)acrylate, and ethylene glycol diglycidyl ether.

6. The thickener according to claim 1,
   wherein the cross-linking agent (b) that is not hydrolytically decomposable is at least one selected from the group consisting of alkylene (having 2 to 5 carbon atoms) glycol diallyl ether, pentaerythritol diallyl ether, trimethylol propane triallyl ether, pentaerythritol triallyl ether, polyglycerol (polymerization degree: 3 to 13) polyallyl ether, and sorbitol triallyl ether.

7. An alkaline battery comprising the thickener according to claim 1 and zinc powder.

8. A method for producing a thickener for use in an alkaline battery, the method comprising the step of:
   mixing a cross-linked polymer (A) and a cross-linked polymer (B),
   wherein the cross-linked polymer (A) comprises a (meth)acrylic acid or salt thereof as a principal constituent monomer unit and a cross-linking agent composed of a cross-linking agent (a) unit alone that is hydrolytically decomposable, and is obtained by aqueous solution polymerization or reversed-phase suspension polymerization, and
   the cross-linked polymer (B) comprises a (meth)acrylic acid or salt thereof as a principal constituent monomer unit and a cross-linking agent composed of a cross-linking agent (b) unit alone that is not hydrolytically decomposable and has 2 to 10 allyl groups, and is obtained by aqueous solution polymerization or reversed-phase suspension polymerization,
   wherein a content (wt %) of the cross-linking agent (a) unit in the cross-linked polymer (A) is 0.05 to 3 wt % based on weight of the cross-linked polymer (A),
   a content (wt %) of the cross-linking agent (b) unit in the cross-linked polymer (B) is 0.05 to 3 wt % based on weight of the cross-linked polymer (B), and
   the cross-linked polymers (A) and (B) are polymerized individually, in such a manner that each of cross-linked polymers (A) and (B) excluding the cross-linked agent has a number-average polymerization degree of 5,000 to 1,000,000.

* * * * *